United States Patent Office 2,746,162
Patented May 22, 1956

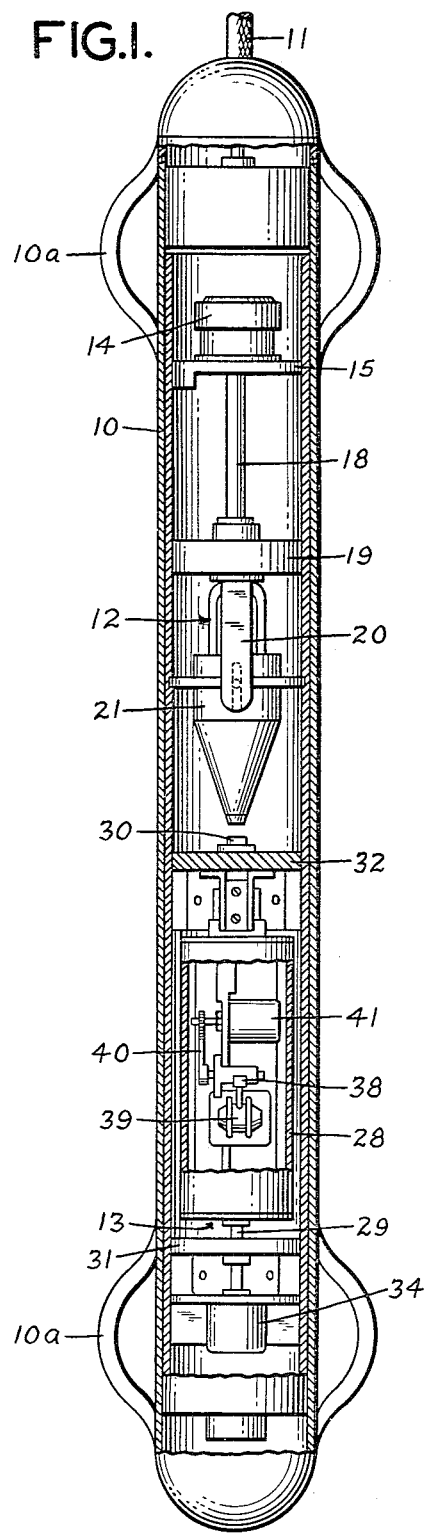
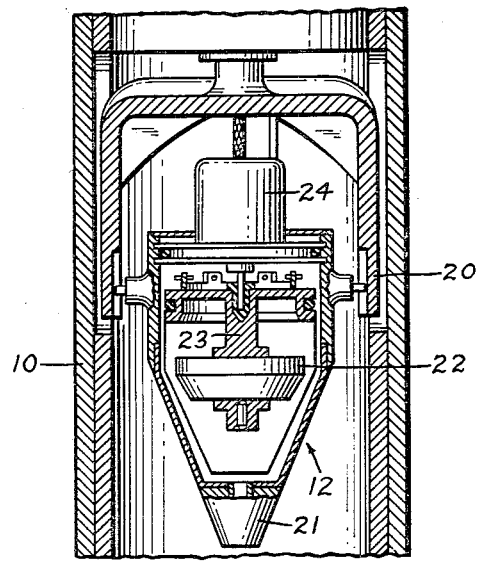
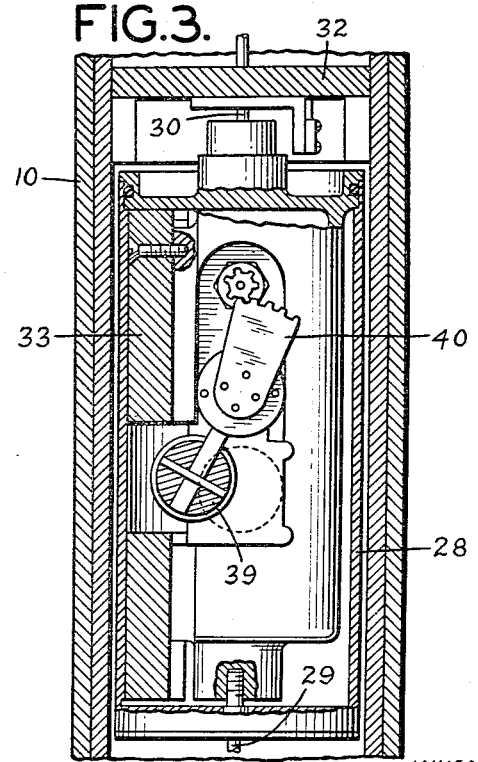

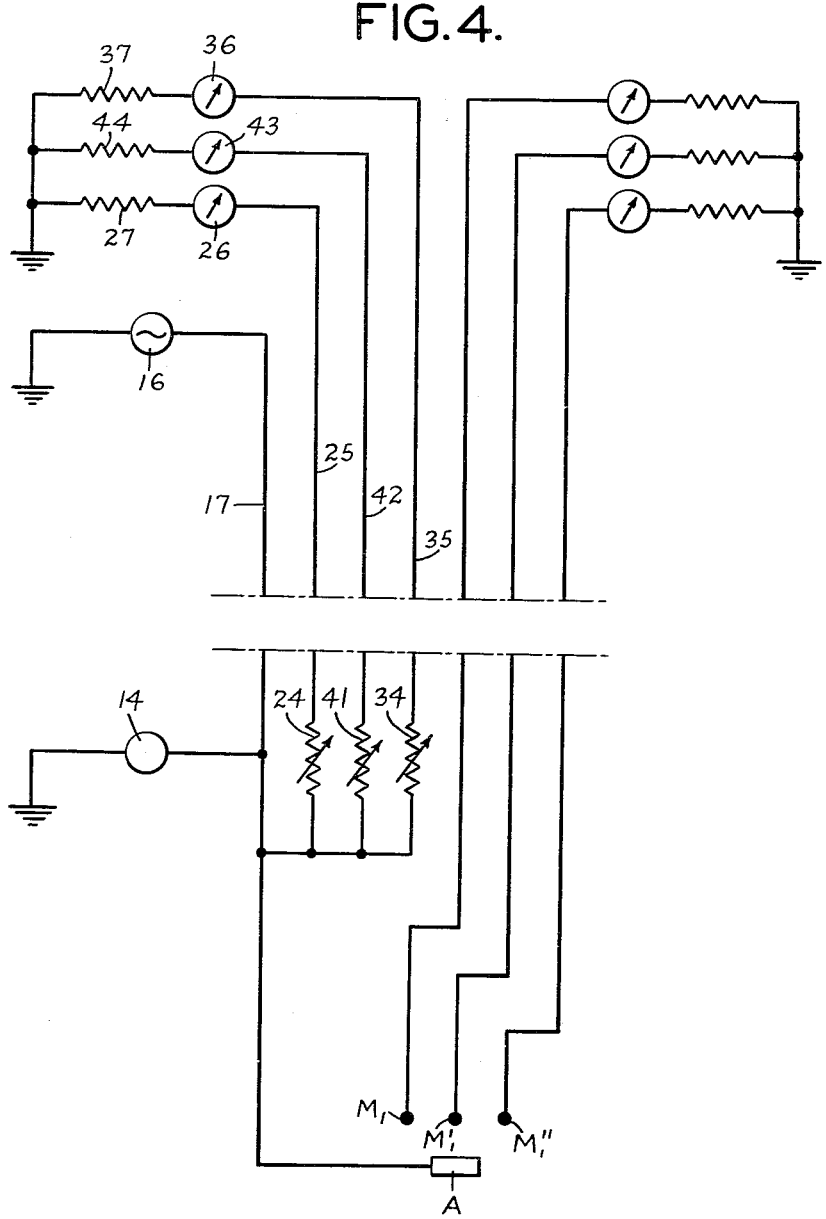

2,746,162

APPARATUS FOR DETERMINING THE DEVIATION OF A BOREHOLE FROM THE VERTICAL AXIS

Maxime Felix Benoit Picard, Paris, France, assignor to Societe de Prospection Electrique Procedes Schlumberger, Paris, France, a corporation of France Application August 12, 1954, Serial No. 449,465
Claims priority, application France August 29, 1953

2 Claims. (Cl. 33—205)

The present invention relates to apparatus providing indications, as a function of depth, of the deviation of wells with respect to the vertical. More specifically, it has to do with new and improved means providing indications at each point in the well of the angle which the well makes with the vertical and of the azimuth with respect to a specified geographical direction of reference of the vertical plane containing the axis of the well in such manner that, by making continuous measurements along the well, the course of the latter in the earth may be exactly determined.

Several different kinds of apparatuses have been proposed heretofore for measuring the deviation of wells. These apparatuses comprise in general a compass or an appropriate indicator of azimuth and an apparatus for measuring and indicating the angular direction of the well with respect to the vertical. These apparatuses often have the disadvantage of being relatively not very exact, principally because of inaccuracy and lack of sensitivity in the compass which doesn't point exactly to the north at each instant, and also from the fact that the apparatus for measuring the angular deviation of the well with respect to the vertical does not give indications that are precise, true and continuous.

The present invention has for its object to overcome these disadvantages and to provide novel apparatus for obtaining indications of the deviation of wells which, although simple in construction and operation gives true and relatively exact measurements of the deviation and of the azimuth of said deviation.

According to the invention, the device for measuring the azimuth of the vertical plane passing through the well with respect to a specified geographic direction, which may be, for example, a compass preferably comprising a small magnetic bar floating in a vessel in a cardan suspension, is constantly subjected to weak percussions or vibrations produced, for example, by a motor driving an eccentric device. In this fashion, the azimuth measuring device is prevented from jamming in any predetermined position and it is obliged consequently to point constantly in the direction of the magnetic north.

The apparatus for measuring the deviation of the axis of the well with respect to the vertical comprises an element adapted to pivot about an axis of the apparatus which is caused to remain constantly parallel to the axis of the well. This pivoting element carries an off-center weight which for any deviation of the bore hole from the vertical constantly lies in a vertical plane passing through the axis of the well or parallel to this axis. A pendulum device movable with respect to the pivoting element in a plane containing the off-center weight provides indications at each instant of the deviation of the axis of the well with respect to the vertical.

The angles assumed respectively by the small magnetic compass bar and by the pendulum and which correspond, respectively, to the azimuth of the deviation and to the angle of deviation itself, are transmitted by means of gearing, for example, to electrical devices capable of producing electrical values such as resistance, for example, varying in amplitude in accordance with variations in the corresponding angles. These electrical devices are incorporated in suitable electric circuit means connected, preferably at the surface of the earth, to suitable measuring or recording instruments.

Other objects and advantages of the invention will appear in the course of the following description, taken with regard to the accompanying drawings, which represent schematically by way of non-limiting example a particular embodiment of the invention and in which:

Fig. 1 is a view, partially in longitudinal section, of bore hole deviation determining apparatus constructed according to the invention;

Fig. 2 is an enlarged view in longitudinal section of a compass device according to the invention for use in the apparatus of Fig. 1;

Fig. 3 is an enlarged view in longitudinal section of novel inclination measuring means also employed in the apparatus of Fig. 1; and Fig. 4 is a schematic diagram of a typical electrical circuit in which the apparatus of Fig. 1 may be connected to facilitate the recording of bore deviations as well as measurements of the azimuths of the deviations, according to the invention.

In Fig. 1 an elongated pressure resistant envelope 10 has a form which permits it to be lowered into the interior of a well while being suspended on an electrical cable 11 of the usual type. The envelope 10 is made of a non-magnetic material so as not to disturb the proper functioning according to the invention of the magnetic compass which forms part of the apparatus. The mode of realization of the invention described hereinafter can be utilized in particular in combination with an instrument for measuring of the dip of earth strata such as that described in U. S. Patent No. 2,427,950. In this case the envelope 10 will carry exterior centering devices 10a as well as dip measuring apparatus (not shown).

Inside the envelope 10 is disposed a compass apparatus 12 and a device for measuring inclinations 13. As can be seen in Fig. 1, the compass apparatus 12 comprises an electric vibrator 14 mounted in a support 15 fixed in the envelope 10. The vibrator 14 may be energized by a source of electrical energy 16 (Fig. 4) one terminal of which is grounded at the surface of the earth, and the other terminal of which is connected to a conductor 17 in the cable 11 which extends to one terminal of the motor 14.

The vibrator 14, which may be a motor driving an eccentric weight, for example, is adapted to give rotational vibrations to a drive shaft 18 passing through a support 19 and connected to a suspension member 20 for a compass mounting 21. Preferably, the vibrations imparted to the shaft 18 by the vibrator 14 should be of an order of magnitude of less than one degree, and the vibrational frequency should be relatively elevated with respect to the resonant frequency of the movable parts of the compass mounting 21 and the fixed member of which is suspended from support 31. The compass mounting 21 is suspended by a universal joint from the suspension device 20 in such manner as to remain horizontal regardless of the angle made by the envelope 10 with the vertical.

As can be seen in Fig. 2, in the interior of the compass mounting 21 is suspended a small magnetic bar 22 which is magnetized in such fashion that one of its extremities is constantly maintained in the direction of the magnetic north. The small magnetic bar 22 is coupled by a suspension member 23 to the movable arm of a rheostat 24, the fixed member of the rheostat being supported on compass mounting 21. The rheostat 24 is electrically energized in such fashion as to give a continuous signal proportional to the angular position of the small magnetic bar 22 with respect to the suspension 20 of the compass. Thus, one terminal of the rheostat 24 (Fig. 4) is connected to the conductor 17 and its other terminal is connected by a conductor 25, the upper end of which is connected in series with a recording type current indicating instrument 26 and a current limiting resistor 27, the circuit being completed through the ground.

Up to the present time, it has not been possible in practice to use compasses of relatively weak power to actuate a rheostat because the arm of the rheostat tended to become jammed, thus giving a false indication of azimuth. However, as a result of the vibrations imparted to the compass suspension 20 by the vibrator 14, there is no longer any chance of the arm of the rheostat 24 becoming stuck, because of the dynamic reduction of friction provoked by the vibrations. Moreover, the interior of the compass mounting 21 is filled with a liquid having a density substantially the same as that of the float containing the small magnetic bar 22. From this fact, all linear vibrations imparted to the compass mounting 21 caused, for example, by a blow on the envelope 10 will not give a false indication to the movement of the rheostat 24.

As can be seen in Fig. 1, below the compass device 12 is mounted an apparatus for measuring inclinations 13. This apparatus for measuring inclinations comprises a hollow cylinder 28 mounted on axial pivots 29 and 30 journalled in suitable bearings in the supports 31 and 32, respectively, mounted in the envelope 10. The cylinder is thus susceptible of turning freely around the pivots 29 and 30 housed in the supports 31 and 32, respectively. One of the sides of the cylinder 28 is weighted by an elongated bar 33 made of heavy material in such fashion that the cylinder 28 comprises an eccentric weight. The part of the cylinder 28 to which the weight 33 is attached will tend to lie in a vertical plane containing the longitudinal axis of the cylinder 28.

The angular position taken by the cylinder 28 with respect to a given point on the envelope 10, and in particular with respect to points determined by the suspension 20 of the compass, is translated into an appropriate electric signal by a rheostat 34, the movable arm of which is connected by means of the pivot 29 to the cylinder 28 and the fixed member of which is suspended from support 31. One terminal of the rheostat 34 is connected to the conductor 17 (Fig. 4) and its other terminal is connected by a conductor 35 to a recording type current idicating instrument 36 and to a current limiting resistor 37, the circuit being completed through the ground.

At the point 38 in the envelope 10 is suspended a pendulum 39 which is capable of swinging only in the plane defined by the weight 33 and the point 38. Thus, the angular position measured by the angle of the pendulum 39 with respect to the longitudinal axis of the cylinder 28 is constantly proportional to the angle of inclination of the envelope 10 with respect to the vertical and, therefore, to that of the well when the envelope 10 is placed in the well. The pendulum 39 is connected by an appropriate gear train mechanism 40 to the movable arm of a rheostat 41, the fixed member of which is supported from cylinder 28, the rheostat thus giving electrical indications constantly proportional to the angular position of the pendulum 39 with respect to the vertical. Thus, the terminals of the rheostat 41 are connected to the conductors 17 and 42, the upper end of the latter being connected to a recording type current indicating instrument 43 and current limiting resistor 44 therefor, the circuit being completed through the intervening earth formations.

In order to prevent false indications due to linear movements of the envelope 10, the cylinder 28 is empty, but the surrounding space is filled with a liquid having substantially the same density as the float constituted by the cylinder 28 containing the pendulum 39.

In operation, the envelope 10 is lowered into a well with the source 16 connected to the vibrator 14 and to the rheostats 24, 34 and 41 as shown in Fig. 4. As the envelope 10 passes through the well, the current indicating instrument 26 will indicate continuously and accurately the angular position of the compass suspension 20 relatively to the magnetic north. At the same time, the current indicating instrument 36 will provide indications of the angular position of the weight 33 on the cylinder 28 with respect to the compass suspension 20. Also, the current indicating instrument 43 will give indications of the angular position of the pendulum 39 relatively to the vertical. From the readings of the instruments 26, 36 and 43, therefore, accurate indications of deviations of the bore hole axis from the vertical may be continuously obtained.

The invention thus provides novel and highly effective apparatus for determining deviations of the longitudinal axis of a well from the vertical.

As shown in Fig. 4, the conductor 17 may also be connected to a current emitting electrode A which is adapted to cooperate with a plurality of potential pickup electrodes $M_1$, $M_1'$ and $M_1''$ to provide indications of the dip of earth strata in accordance with the method disclosed in the aforesaid Patent No. 2,427,950.

Of course, numerous modifications can be made in the illustrative embodiment described above without departing from the scope of the present invention as defined in the following claims.

I claim:

1. In apparatus for determining the angular deviation of the longitudinal axis of a well from the vertical and the azimuthal direction of said deviation, the combination of a housing adapted to be lowered into a well, means carried by the housing for maintaining the longitudinal axis thereof in fixed relation to the longitudinal axis of the well, compass means having a continuously north pointing movable element, universal joint means supporting said compass means in said housing, first electrical circuit means including electrical indicating means at the surface of the earth and an adjustable element coupled to said compass movable element for varying a parameter in said first electrical circuit means according to the position of said compass movable element relatively to a reference position, means for imparting relatively weak vibrations to said compass means to render said compass movable element continuously freely movable, a member mounted for pivoting movement in said housing about an axis having the same direction as the longitudinal axis of the well, an off-center weight carried by said member, second electrical circuit means including electrical indicating means at the surface of the earth and an adjustable element coupled to said member for varying a parameter in said second circuit means according to the angular position of said off-center weight relatively to a reference position, pendulum means mounted for swinging movement in a plane including said weight and the pivotal axis of said member, and third electrical circuit means including electrical indicatng means at the surface of the earth and an adjustable element coupled to said pendulum means for varying a parameter in said third electrical circuit means according to the angular position of said pendulum means relatively to a reference position.

2. Apparatus as defined in claim 1 in which the movable element of said compass means is immersed in a liquid having substantially the same density as said movable element, and said member is immersed in a liquid having substantially the same density as said member.

References Cited in the file of this patent

UNITED STATES PATENTS

| | | |
|---|---|---|
| 1,452,485 | Tanner | Apr. 17, 1923 |
| 1,868,833 | Hester | July 26, 1932 |
| 2,309,905 | Irwin et al. | Feb. 2, 1943 |
| 2,317,632 | Miller | Apr. 27, 1943 |
| 2,427,950 | Doll | Sept. 23, 1947 |
| 2,454,184 | Kliever | Nov. 16, 1948 |
| 2,611,191 | Noxon et al. | Sept. 23, 1952 |
| 2,632,959 | Boucher | Mar. 31, 1953 |